(12) United States Patent
Wang et al.

(10) Patent No.: US 11,729,273 B2
(45) Date of Patent: Aug. 15, 2023

(54) ADJUSTING IDLE TIMEOUT FOR A SESSION

(71) Applicant: International Business Machines Corporation, Armonk, NY (US)

(72) Inventors: Jin Wang, Xi'an (CN); Lei Gao, Xi'an (CN); A Peng Zhang, Xi'an (CN); Kai Li, Xi'an (CN); Jun Wang, Xian (CN); Yan Liu, Xi'an (CN); Jia Xing Tang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/647,094

(22) Filed: Jan. 5, 2022

(65) Prior Publication Data

US 2023/0216926 A1    Jul. 6, 2023

(51) Int. Cl.
*H04L 67/143* (2022.01)
(52) U.S. Cl.
CPC .................... *H04L 67/143* (2013.01)
(58) Field of Classification Search
CPC .................................................. H04L 67/143
See application file for complete search history.

(56) References Cited

U.S. PATENT DOCUMENTS

| 10,812,462 | B2 | 10/2020 | Xu et al. |
| 11,012,455 | B2 | 5/2021 | Backer et al. |
| 2015/0253838 | A1* | 9/2015 | Amsterdam .......... G06F 40/289 713/323 |
| 2016/0170771 | A1* | 6/2016 | Goldman ............ G06F 15/8007 712/22 |
| 2020/0099753 | A1* | 3/2020 | Fleck ........................ G06F 9/54 |

FOREIGN PATENT DOCUMENTS

| CN | 112997153 A | 6/2021 |
| JP | 2006146298 A | 6/2006 |

OTHER PUBLICATIONS

Turai, "HAProxy Logging-How to Tune Timeouts for Performance," ©2021, pp. 1-7.

* cited by examiner

*Primary Examiner* — Glenton B Burgess
*Assistant Examiner* — Patrick F Ngankam
(74) *Attorney, Agent, or Firm* — Patterson + Sheridan, LLP

(57) ABSTRACT

Systems and techniques for determining an idle timeout for a cloud computing session are described. An example technique includes determining a first one or more attributes associated with a user of the cloud computing session and determining a second one or more attributes associated with an operation of the cloud computing session. An idle timeout for the cloud computing session is determined, based at least in part on the first one or more attributes and the second one or more attributes. User activity is monitored during the cloud computing session. Upon determining, based on the monitoring, an absence of the activity of the user within a duration of the idle timeout, the cloud computing session is terminated.

18 Claims, 6 Drawing Sheets

ADJUSTING IDLE TIMEOUT FOR A SESSION

BACKGROUND

The present invention relates to cloud computing and, more specifically, to techniques for intelligently setting and adjusting the idle timeout for a cloud computing session.

Cloud computing services are increasingly being used to support a variety of different services and applications. Such services and applications can include, but are not limited to, data analytics, predictive modeling, storage, networking, application deployment, building and training machine learning models, etc. A cloud computing service can be implemented using different platforms, including, for example, Infrastructure-as-a-Service (IaaS), Software-as-a-Service (SaaS), Platform-as-a-Service (PaaS), etc. Additionally, a cloud computing service can be deployed as a private cloud, a community cloud, a public cloud, or a hybrid cloud (e.g., a combination of two or more clouds).

Cloud computing services may enable users to interact with various services and applications using a client-server (request-response model). In certain cloud deployments, such as public cloud deployments, users may be charged based on the amount of time that the user interacts with the cloud computing service. To save costs and resources, these cloud deployments may terminate a cloud computing session after expiration of a fixed timeout value. However, using a fixed timeout value across a wide variety of different services, applications, and users can lead to inefficient use of public cloud resources and lead to increased costs for users interacting with cloud resources.

SUMMARY

One embodiment described herein includes a computer-implemented method for determining an idle timeout for a cloud computing session. The computer-implemented method includes determining a first one or more attributes associated with a user of the cloud computing session and determining a second one or more attributes associated with an operation of the cloud computing session. The computer-implemented method also includes determining an idle timeout for the cloud computing session, based at least in part on the first one or more attributes and the second one or more attributes. The computer-implemented method also includes monitoring activity of the user during the cloud computing session. The computer-implemented method further includes upon determining, based on the monitoring, an absence of the activity of the user within a duration of the idle timeout, terminating the cloud computing session.

Another embodiment described herein includes a computing system. The computing system includes one or more processors and a memory including instructions, which when executed by the one or more processors, performs an operation for determining an idle timeout for a cloud computing session. The operation includes determining a first one or more attributes associated with a user of the cloud computing session and determining a second one or more attributes associated with an operation of the cloud computing session. The operation also includes determining an idle timeout for the cloud computing session, based at least in part on the first one or more attributes and the second one or more attributes. The operation also includes monitoring activity of the user during the cloud computing session. The operation further includes upon determining, based on the monitoring, an absence of the activity of the user within a duration of the idle timeout, terminating the cloud computing session.

Another embodiment described herein includes a computer-readable storage medium having computer-readable program code embodied therewith. The computer-readable program code is executable by one or more computer processors to perform an operation for determining an idle timeout for a cloud computing session. The operation includes determining a first one or more attributes associated with a user of the cloud computing session and determining a second one or more attributes associated with an operation of the cloud computing session. The operation also includes determining an idle timeout for the cloud computing session, based at least in part on the first one or more attributes and the second one or more attributes. The operation also includes monitoring activity of the user during the cloud computing session. The operation further includes upon determining, based on the monitoring, an absence of the activity of the user within a duration of the idle timeout, terminating the cloud computing session.

DETAILED DESCRIPTION

Figure 1:
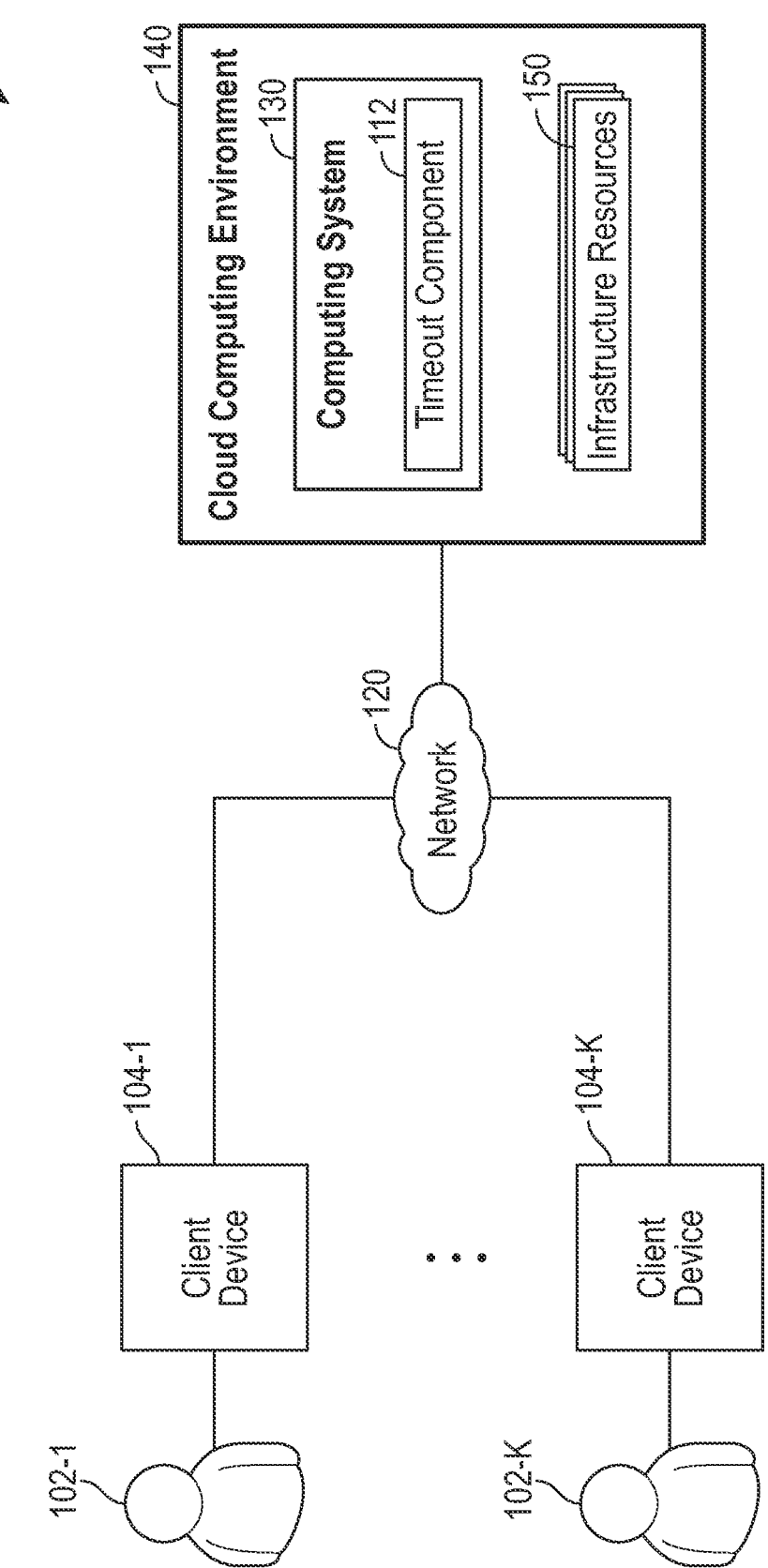
FIG. 1 illustrates an example system, according to certain embodiments.

Cloud computing environments may allow users to interact with various services, applications, etc., provided by the cloud computing environment. These cloud computing environments generally use an idle timeout (also referred to as an idle timeout period, idle timeout interval, or inactivity timer) to determine whether a user is still interacting with the cloud computing environment. That is, the idle timeout can be used to determine whether the cloud computing session is still active. For example, if the idle timeout has expired (meaning no user activity is detected within the idle timeout period), then the cloud computing environment may terminate (or end) the cloud computing session. On the other hand, the cloud computing environment may maintain the cloud computing session when the idle timeout has not expired (meaning user activity has been detected within the idle timeout period).

One issue with existing cloud computing environments is that they typically use the same fixed idle timeout for all users that interact with the cloud computing environment. However, using a fixed idle timeout can waste cloud computing resources and/or lead to increased costs for users that pay to use a cloud computing environment. For example, in some instances, a single fixed idle timeout may result in some users' cloud computing sessions lasting longer than needed for those users' particular use cases, increasing the costs of interacting with the cloud computing environment for those users. Additionally or alternatively, because a single fixed idle timeout may cause a cloud computing session to last longer than needed, resources that could be used for other cloud computing sessions for other users can be tied up, resulting in an inefficient use of cloud computing resources.

To address this, embodiments described herein provide systems and techniques for intelligently adjusting an idle timeout for a cloud computing session. More specifically, embodiments can determine, for a given user, a specific idle timeout to use for that user's cloud computing session that may or may not be different from idle timeouts determined for other users' cloud computing sessions. As described below, embodiments may determine the specific idle timeout to use for a given user, based on attributes associated with the user, attributes associated with the cloud computing session, or a combination of attributes associated with the user and attributes associated with the cloud computing session. By setting an idle timeout associated with a cloud computing session in this manner, embodiments can significantly reduce the costs associated with interacting with cloud computing environments and/or increase the efficiency of cloud computing resource usage.

Additionally or alternatively, embodiments described herein can adjust a value of the idle timeout used for a given cloud computing session while the cloud computing session is still active. For example, embodiments can predict the value to use for an idle timeout at a given time instance during the cloud computing session based on (i) a set of actions performed by the user during the cloud computing session within a predetermined time interval prior to the time instance and (ii) a predicted set of actions likely to be performed by the user during the cloud computing session within a predetermined time interval subsequent to the time instance. By adaptively adjusting the idle timeout of a cloud computing session in this manner, embodiments can more accurately set idle timeouts based on the user's operation history during a cloud computing session, saving costs and cloud computing resources.

Note embodiments of the disclosure are described herein using interactions between computing systems and a cloud computing platform as a reference example of a type of deployment scenario in which the techniques for determining an idle timeout for a cloud computing session can be used (e.g., between server and client). Of course, those of ordinary skill in the art will recognize that the techniques presented herein for determining an idle timeout can be adapted for use in other deployment scenarios and/or applications, such as web applications, online gaming, peer-to-peer communications, etc.

FIG. 1 illustrates an example system 100, according to certain embodiments. As illustrated, the system 100 includes one or more client devices 104 1-K and a cloud computing environment 140 (also referred to herein as a cloud platform or cloud), interconnected via a network 120.

In certain embodiments, users 102 1-K may use client devices 104 1-K, respectively, to access and interact with the cloud computing environment 140. Client device 104 is representative of any suitable device for communicating with components of the system 100 over the network 120. As an example and not by way of limitation, the client device 104 may be a computer, a laptop, a wireless or cellular telephone, an electronic notebook, a personal digital assistant, a tablet, or any other device capable of receiving, processing, storing, or communicating information with other components of the system 100. In certain embodiments, the client device 104 is a wearable device such as a virtual reality or augmented reality headset, a smart watch, or smart glasses. Although not shown, the client device 104 can include a user interface, such as a display, a microphone, keypad, or other appropriate terminal equipment usable by the user 102. The client device 104 may include a hardware processor, memory, and/or circuitry configured to perform any of the functions or actions of the client device 104 described herein. For example, a software application designed using software code may be stored in the memory and executed by the processor to perform the functions of the client device 104.

The network 120 is any suitable network operable to facilitate communication between the components of the system 100. The network 120 may include any interconnecting system capable of transmitting audio, video, signals, data, messages, or any combination of the preceding. The network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Cloud computing environment 140 is representative of any suitable cloud computing service (or platform). As an example and not by way of limitation, the cloud computing environment 140 can include an Infrastructure-as-a-Service (IaaS), a Software-as-a-Service (SaaS), a Plaftform-as-a-Service (PaaS), a Mobile Backend-as-a-Service (MBaaS), etc. The cloud computing environment 140 forms an execution environment for various different jobs in the system 100 and may be used to provide a variety of services to users. These services can include, for example, compute resources (e.g., processors, servers, etc.), storage, databases, analytics, networking, machine learning model training, mobile, management tools, security, applications, etc.

Here, the cloud computing environment 140 includes a computing system 130 and one or more infrastructure resources 150. As used herein, an infrastructure resource (also referred to as infrastructure component, infrastructure system, computing resource, etc.) may refer to a resource hosted in a cloud computing environment. Examples of infrastructure resources can include, but are not limited to, cloud computing instances, database instances, virtual network devices, storage devices, data, operating systems, applications, etc. The computing system 130 may be one of the infrastructure resources 150.

The cloud computing environment 140 can be deployed using different types of deployment models. In one example, the cloud computing environment 140 is deployed using a private cloud model. A private cloud includes infrastructure resources that are accessible to only a limited set of parties (e.g., the owners or operators of the infrastructure resources). In another example, the cloud computing environment 140 is deployed using a public cloud model. Compared to a private cloud, a public cloud includes infrastructure resources that are accessible by a large set of parties or the general public. In yet another example, the cloud computing environment 140 is deployed using a hybrid cloud model (e.g., a combination of a private cloud and a public cloud).

In certain embodiments, a user (e.g., user 102) may interact with the cloud computing environment 140 using a request-response model (e.g., client-server) model. For example, during a cloud computing session, the user (via a client device 104) may send one or more application programming interface (API) requests to the cloud computing environment. The cloud computing environment 140 may receive and process the request, and generate and send an API response to the user. In certain embodiments described herein, the cloud computing environment 140 may monitor the cloud computing session to determine whether the cloud computing session is active or has been idle for a predetermined amount of time. This predetermined amount of time may be referred to herein as an idle timeout.

As shown, the cloud computing environment 140 includes a timeout component 112, which is configured to perform one or more techniques described herein for determining and adjusting (or varying) an idle timeout for a cloud computing session. Although the timeout component 112 is depicted within a computing system 130, which is located within the cloud computing environment 140, in some embodiments, the timeout component 112 can be deployed on a computing system (not shown), which is external to the cloud computing environment 140. The timeout component 112 may include software components, hardware components, or a combination of software and hardware components.

As opposed to setting one fixed idle timeout that is the same for all users 102, the timeout component 112 can set a specific idle timeout for each cloud computing session between a different user 102 and the cloud computing environment 140. The timeout component 112 may set the idle timeout to use for a given cloud computing session for a given user based on attributes associated with the user, attributes associated with the cloud computing session, or a combination of attributes associated with the user and attributes associated with the cloud computing session. Additionally, during the cloud computing session, the timeout component 112 can adjust the value of the idle timeout at particular points in time during the cloud computing session, based on a set of actions previously performed by the user during the cloud computing session and a predicted set of actions likely to be performed by the user during the cloud computing session.

Figure 2:
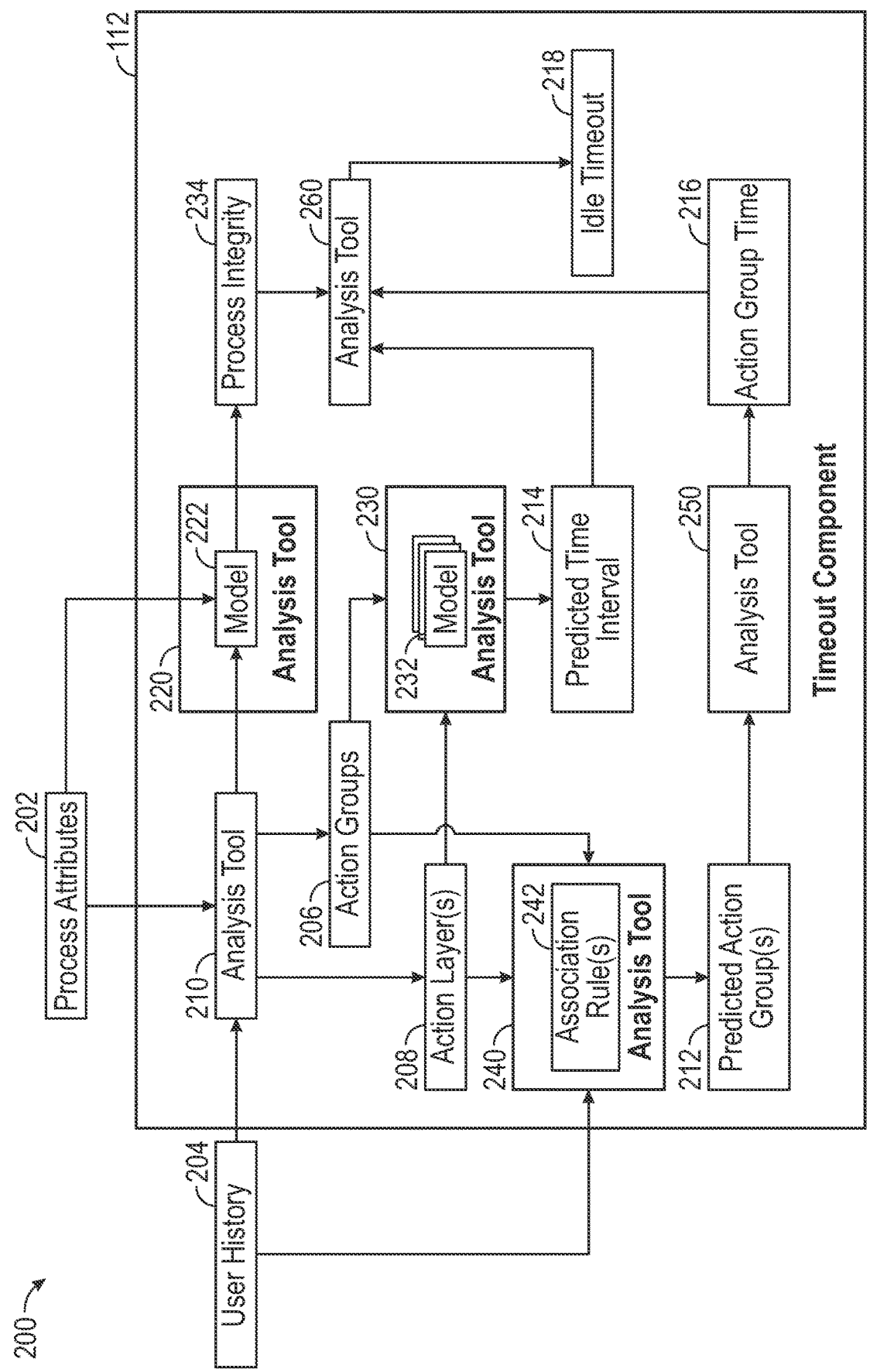
FIG. 2 illustrates an example workflow for setting and adjusting an idle timeout for a cloud computing session, according to certain embodiments.

FIG. 2 illustrates a workflow 200 for setting and adjusting an idle timeout for a cloud computing session, according to certain embodiments. The workflow 200 may be implemented with one or more components of the timeout component 112. As shown in this particular embodiment, the timeout component 112 includes an analysis tool 210, an analysis tool 220, an analysis tool 230, an analysis tool 240, an analysis tool 250, and an analysis tool 260.

The analysis tool 210 receives one or more process attributes 202, which may include any information associated with the cloud computing process (or operation) for the cloud computing session. By way of example and not by way of limitation, assume the cloud computing session involves building and deploying the machine learning pipeline 300 illustrated in FIG. 3. The machine learning pipeline 300 includes a source node 310, a data transformation node 320, a model building node 330, and a visualization node 340. In this example, the process attributes 202 may include information regarding the number of nodes, the types of nodes, the operations performed by the nodes, etc. The node type can include an extract(ing), transform(ing), load(ing) (ETL) node or a machine learning process node. The types of nodes (or operation) may be assigned values representative of the operations within the process attributes 202. As a reference example, for the source node 310, data transformation node 320, model building node 330, and visualization node 340 may be represented as (1, 2, 3, 4), where ETL is 1→2, machine learning is 1→2→3, and 4 is optional.

Figures 3, 4:
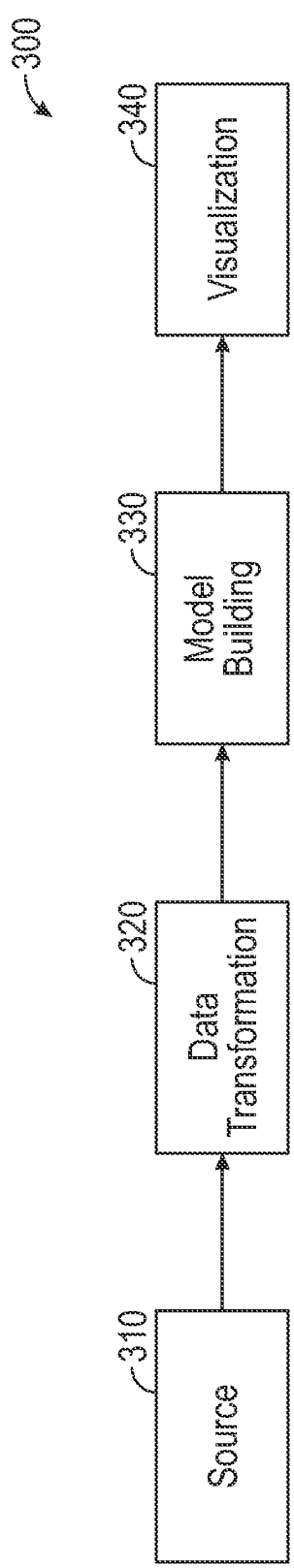
FIG. 3 illustrates an example machine learning pipeline, according to certain embodiments.
FIG. 4 illustrates an example of an attribute vector, according to certain embodiments.

Additionally, in certain embodiments, the process attributes 202 may include one or more data parameters associated with each node (or operation). Referring again to the machine learning pipeline 300, each node may be associated with a vector of N dimensions, where the vector specifies one or more data parameters, including, for example, row, columns number, category, continuous range, discrete range, business purpose etc. Each of the N dimensions may represent the number of nodes or operation types. An example vector 400 is illustrated in FIG. 4, which includes a parameter part 410 and a type part 420. The analysis tool 210 generates the model 222, based on the process attributes 202. For example, in certain embodiments, the model 222 is a cluster model that is generated based on the data parameters of the process attributes 202 (e.g., data parameters 1-i of the vector 400 illustrated in FIG. 4).

The analysis tool 220 generates a process integrity 234, based on evaluating one or more the process attributes 202 with the model 222. The process integrity 234 is generally a confidence associated with the process/operation being performed during the cloud computing session. In certain embodiments, the analysis tool 220 can generate the process integrity 234 by using the parameter part vector (e.g., parameter part vector 410) to determine a position in the (cluster) model 222. The analysis tool 220 can then use the K nearest neighbor vectors to calculate the distances on the type part vector (e.g., type part vector 420). The analysis tool 220 may obtain L distances that are less than the preset (or predefined) distance. The predefined distance may be set (and/or modified) by the user. In certain embodiments, the predefined distance may be 75% of the largest distance. The process integrity 234 may then be defined as L/K*100%.

The analysis tool 210 also receives a user history 204, which includes a user history of actions (or processes or operations) from prior cloud computing sessions, a user history of actions (or processors or operations) from the current cloud computing session, etc. The analysis tool 210 can generate a set of action groups 206 and action layer(s) 208, based on the user history 204 and the process attributes 202. In certain embodiments, the analysis tool 210 can acquire an operation time based on a set of data groups. For example, for all record time interval, the analysis tool 210 can use a normal distribution on ($\mu$–A$\sigma$, $\mu$+A$\sigma$) to create M data groups, where A and M are adjustable based on performance requirements. In some cases, A may be a value between 0 and 3. For example, the analysis tool 210 can create 3 data groups using ($\mu$–$\sigma$/2, $\mu$+$\sigma$/2) ($\mu$–3$\sigma$, $\mu$+3$\sigma$).

The action layer(s) 208 may be defined in advance, based on the actions associated with the processes. In certain embodiments, the action layer(s) 208 may be associated with short, medium, and long period actions. As a reference example, "edit", "view" and "run" actions can correspond to short, medium, and long period actions, respectively. In some examples, each action can be converted to one P dimension vector (e.g., one edit action can be defined as (1,0,0)).

The analysis tool 210 can aggregate some operations together to reduce data size. For example, an action group 206 may be formed as a set of valid action(s) until a predefined time period has elapsed with no further actions. For instance, assuming there are two edits, four views, and 1 run in the machine learning pipeline 300 within a predefined period, then the action group may be defined as (2,4,1). As described below, a time interval may be determined between each action group 206.

The analysis tool 230 can determine a predicted time interval 214, based on evaluating the action groups 206 and action layers 208 using one or more models 232. For each action layer, the analysis tool 230 can use the following Equation (1) to determine the total execution time T for an action group:

$$T = \sum_{i=0}^{P} \beta_i X_i \quad (1)$$

where $\beta_i$ represents the execute time for an action layer i and $X_1$ is the action number for the action layer i. The analysis tool 230 can determine a $\beta_{final}$ for M action groups using the following Equations (2) and (3):

$$W_i = \frac{1}{CDF_i} \quad (2)$$

$$B_{final} = \frac{\sum_{i=0}^{M} \beta_i W_i}{\sum_{i=0}^{M} W_i} \quad (3)$$

where $\beta_{final}$ is representative of the final action execute time.

The analysis tool 230 can build one or more (time series) models 232 to predict the time interval (e.g., predicted time interval 214) between each action group 206, based at least in part on $\beta_{final}$. For example, the analysis tool 230 can build M time series models 232 for the M data groups to predict the time interval 214. The analysis tool 230 can combine the M time series with a weight related with a CDF value similar to Equations (2)-(3), such that the predicted time interval 214 can be represented using the following Equation (4):

$$TI = \frac{\sum_{i=0}^{M} TI_i W_i}{\sum_{i=0}^{M} W_i} \quad (4)$$

The analysis tool 240 receives the user history 204, the set of action groups 206, and the action layer(s) 208, and generates an association rule(s) 242 based on the information. The association rule(s) 242 are used to predict a next action group(s) (e.g., predicted action group(s) 212) based on a set of previous action group(s) (e.g., action group(s) 206). The predicted action group may be represented as a vector with P dimension $(B_1, B_2, \ldots, B_P) \rightarrow (A_1, A_2, \ldots, A_P)$ (e.g., $(2,4,1) \rightarrow (5,1,0)$). The analysis tool 250 receives the predicted action group(s) 212 and generates an action group time 216 using the following Equation (5):

$$TA = \frac{\sum_{i=0}^{M} W_i \sum_{j=0}^{P} \beta_j A_j}{\sum_{i=0}^{M} W_i} \quad (5)$$

The analysis tool 260 receives the process integrity 234, the predicted time interval 214, and the action group time 216, and generates the idle timeout 218, based on the information. For example, the idle timeout 218 may be generated using the following Equation (6):

$$\text{Idle Timeout} = \frac{TI + TA}{\text{Integrity}} \quad (6)$$

The timeout component 112 may continue using the workflow 200 to set and/or adjust the timeout based on the action groups of the user during the cloud computing session. For example, if during the idle timeout, a new action group is observed, the timeout component 112 can delay with a new calculated value for the idle timeout. Otherwise, if the idle timeout expires, the timeout component 112 may stop the cloud computing session.

Figure 5:
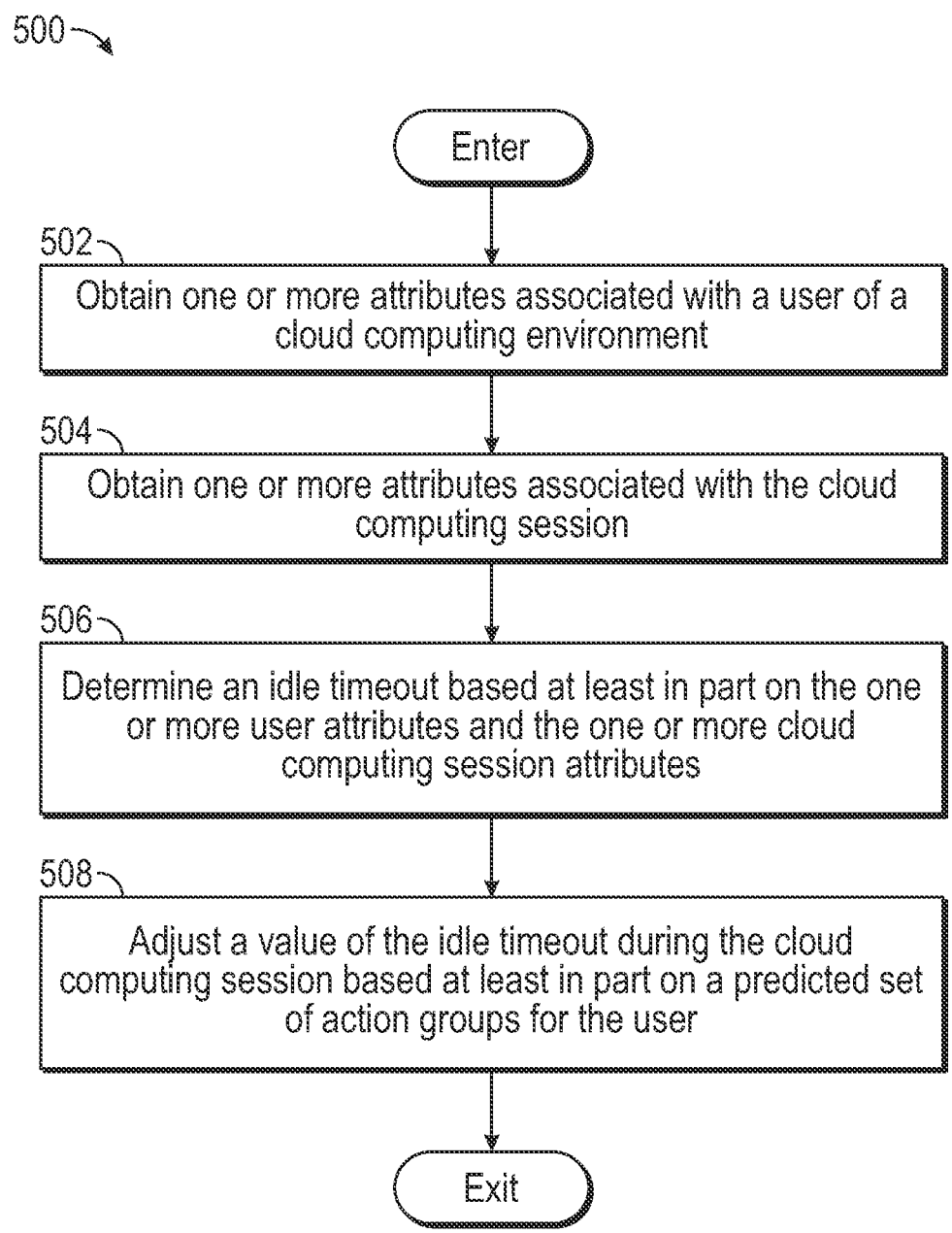
FIG. 5 is a flowchart of a method for determining an idle timeout for a cloud computing session, according to certain embodiments.

FIG. 5 is a flowchart of a method 500 for determining an idle timeout for a cloud computing session, according to certain embodiments. The method 500 may be performed by a computing system (e.g., timeout component 112). The computing system may be part of a cloud computing environment (e.g., cloud computing environment 140).

Method 500 enters at block 502 where the computing system obtains one or more attributes associated with a user of a cloud computing environment. The one or more attributes can include, for example, the user history scenario, including the user's operation habit from previous cloud computing sessions as well as the user's operation habit during a current cloud computing session.

At block 504, the computing system obtains one or more attributes associated with the cloud computing session. The cloud computing session attributes can include, for example, the data size, process integrity, set of action groups, etc.

At block 506, the computing system determines an idle timeout based at least in part on the one or more user attributes and the one or more cloud computing session attributes. In certain embodiments, the computing system can determine the idle timeout using the workflow 200 described in greater detail above. For example, the computing system can form data groups combined with weight(s) generated from distributions and form action groups that represent one series operations. The computing system can then use machine learning techniques to acquire the time interval between action groups and to determine the idle timeout.

At block 508, the computing system adjusts value of the idle timeout during the cloud computing session based at least in part on a predicted set of action groups for the user. The method 500 may then exit. In certain embodiments, the idle timeout determined using method 500 may be one of multiple idle timeouts, where a value of the idle timeout is different than at least one other idle timeout of the multiple timeouts.

In certain embodiments, determining the idle timeout (at block 506) includes determining a process integrity metric associated with the operation of the cloud computing session, based at least in part on evaluating at least one of the second one or more attributes with a cluster model. For example, the second one or more attributes may include a vector having a parameter part (e.g., parameter part vector 410) and a type part (e.g., type part vector 420). In this example, the process integrity metric may be determined by (i) determining, in the cluster model, a position associated with the process integrity metric, based on the parameter part of the vector and (ii) determining a number of distances from the position, based on the type part of the vector.

In certain embodiments, in addition to determining the process integrity metric, determining the idle timeout (at block 506) includes determining a set of action groups associated with the operation of the cloud computing session, where each action group in the set of action groups includes one or more actions performed as part of the operation. In these embodiments, determining the idle timeout may further include generating a set of time series models, where each time series model is associated with a different action group of the set of action groups and is configured to predict a time interval between the associated action group and another action group of the set of action groups. A global time interval may be determined based on the predicted time intervals. Determining the idle timeout may further include (i) determining a set of predicted action groups associated with the operation of the cloud computing session, based at least in part on the set of action groups and (ii) determining an amount of time associated with performing the set of predicted action groups. The idle timeout may then be determined based on (i) the amount of time associated with performing the set of predicted action groups, (ii) the process integrity metric, and (iii) the global time interval.

Figure 6:
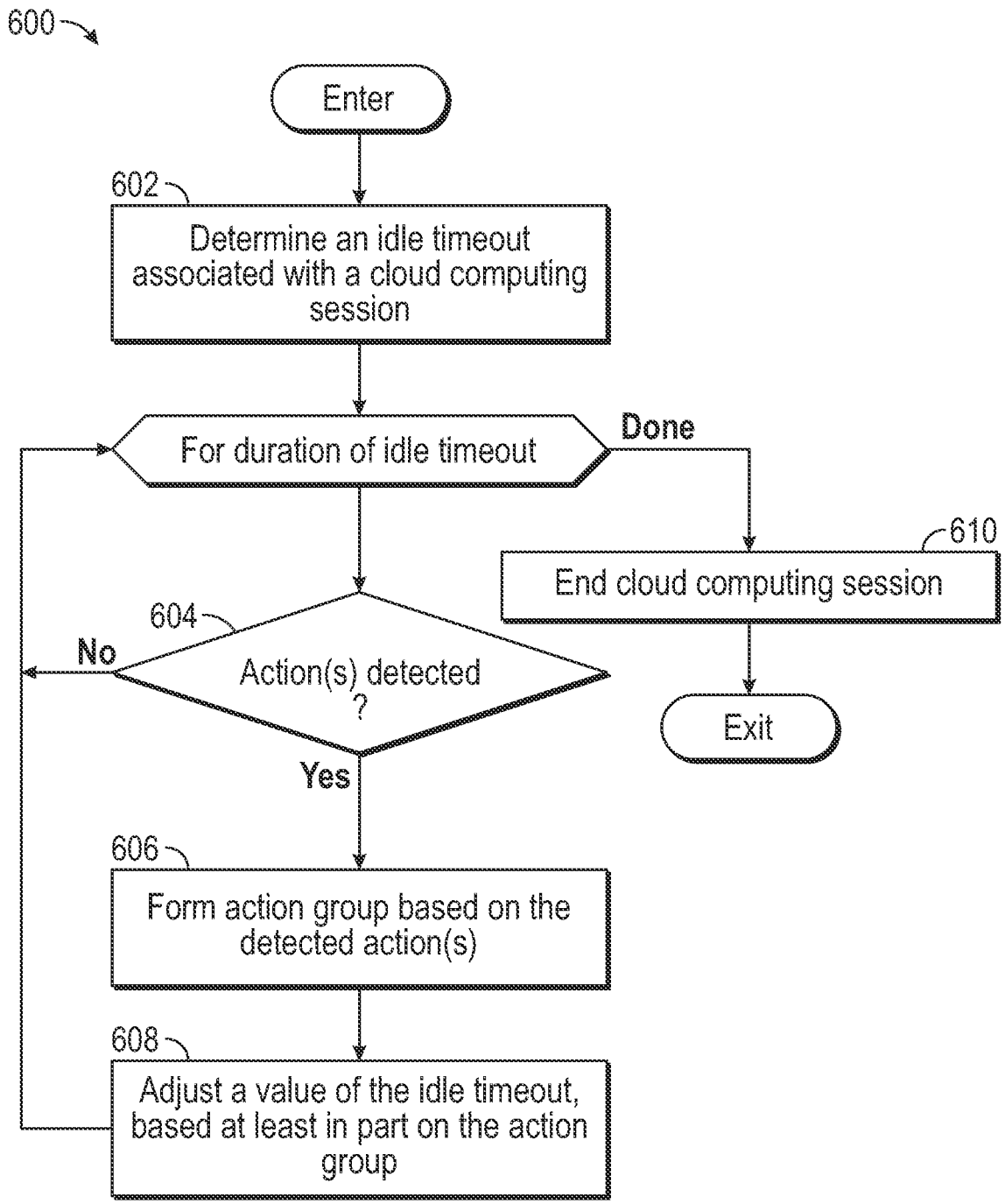
FIG. 6 is a flowchart of a method for managing a cloud computing session based on an idle timeout, according to certain embodiments.

FIG. 6 is a flowchart of a method 600 for managing a cloud computing session based on an idle timeout, according to certain embodiments. The method 600 may be performed by a computing system (e.g., timeout component 112). The computing system may be part of a cloud computing environment (e.g., cloud computing environment 140).

Method 600 may enter at block 602, where the computing system determines an idle timeout associated with a cloud computing session for a user (e.g., using the workflow 200 described above). The computing system may perform one or more of blocks 604, 606, and 608 for a duration of the idle timeout. At block 604, the computing system determines whether one or more actions have been detected as part of the cloud computing session during the idle time out (e.g., prior to an expiration of the idle timeout). If no action have been detected, the method 600 continues to block 604 until the idle timeout has expired. After the duration of the idle timeout, the computing system ends (or terminates) the cloud computing session (block 610).

On the other hand, if an action(s) has been detected at block 604, the computing system forms (or determines) an action group based on the detected actions (block 606). The computing system then adjusts a value of the idle timeout, based at least in part on the action group (block 608).

Figure 7:
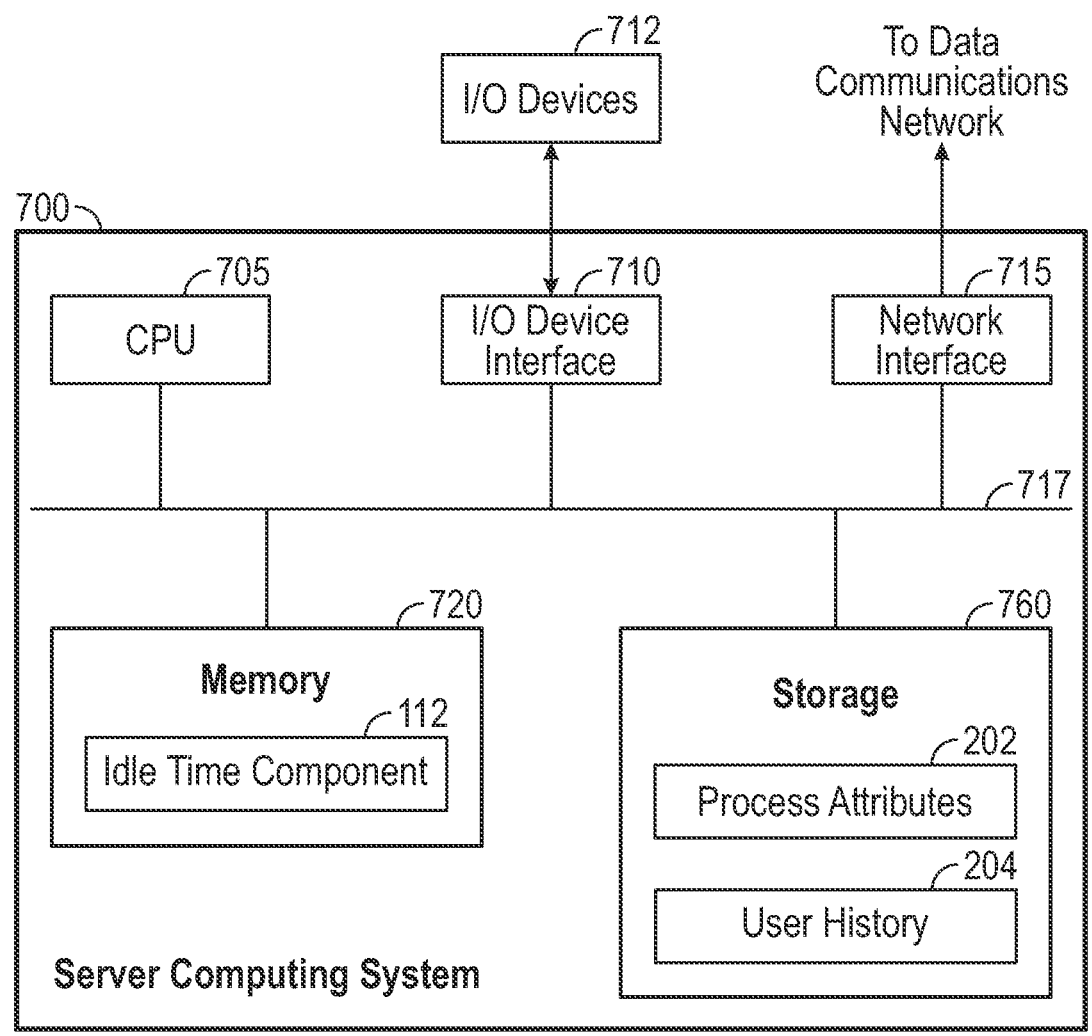
FIG. 7 illustrates an example computing system, according to certain embodiments.

FIG. 7 illustrates an example server computing system 700 configured to determine and adjust an idle timeout for a cloud computing session, according to certain embodiments. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, display and mouse devices) to the computing system 700. The computing system 700 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 705 retrieves and executes programming instructions stored in the memory 720 as well as stored in the storage 760. The bus 717 is used to transmit programming instructions and application data between the CPU 705, I/O device interface 710, storage 760, network interface 715, and memory 720. Note, CPU 705 is included to be representative of a single CPU, multiple CPUs, a single CPU having multiple processing cores, and the like, and the memory 720 is generally included to be representative of a random access memory. The storage 760 may be a disk drive or flash storage device. Although shown as a single unit, the storage 760 may be a combination of fixed and/or removable storage devices, such as fixed disc drives, removable memory cards, optical storage, network attached storage (NAS), or a storage area-network (SAN). Illustratively, the memory 720 includes the idle time component 112, which is discussed in greater detail above. Further, storage 760 includes process attributes 202 and user history 204, which are also discussed in greater detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access infrastructure resources 150 or related data available in the cloud as part of a cloud computing session, and the timeout component 112 may determine whether to end (or terminate) the cloud computing session based on an idle timeout determined for the cloud computing session. In such a case, the timeout component 112 could adaptively adjust the idle timeout used for a user and store a history of the idle timeouts used for a given user at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for determining an idle timeout for a cloud computing session, the computer-implemented method comprising:
   determining a first one or more attributes associated with a user of the cloud computing session;
   determining a second one or more attributes associated with an operation of the cloud computing session;
   determining an idle timeout for the cloud computing session, based at least in part on the first one or more attributes and the second one or more attributes, wherein the idle timeout is set to a first value;
   monitoring activity of the user during the cloud computing session; and
   upon determining, based on the monitoring, that there is activity of the user within a duration of the idle timeout set to the first value:
      determining a first set of action groups, based on the activity;
      predicting a second set of action groups, based on an evaluation of the first set of action groups;
      determining a second value for the idle timeout, based on the first set of action groups and the second set of action groups, wherein determining the second value for the idle timeout comprises (i) generating a set of time series models, each time series model being associated with a different action group of the second set of action groups and being configured to predict a time interval between the associated action group and another action group of the second set of action groups and (ii) determining a global time interval based on the predicted time intervals; and
      adjusting the idle timeout by setting the idle timeout to the second value, wherein the second value is different from the first value.

2. The computer-implemented method of claim 1, wherein:
   the idle timeout is one of a plurality of idle timeouts; and
   at least one of the first value or the second value of the idle timeout is different than at least one other idle timeout of the plurality of idle timeouts.

3. The computer-implemented method of claim 1, wherein determining the idle timeout comprises determining a process integrity metric associated with the operation of the cloud computing session, based at least in part on evaluating at least one of the second one or more attributes with a cluster model.

4. The computer-implemented method of claim 3, wherein:
   the second one or more attributes comprises a vector having a parameter part and a type part; and
   determining the process integrity metric further comprises:
      determining, in the cluster model, a position associated with the process integrity metric, based on the parameter part of the vector; and
      determining a number of distances from the position, based on the type part of the vector.

5. The computer-implemented method of claim 3, wherein each action group in the second set of action groups comprises one or more actions performed as part of the operation of the cloud computing session.

6. The computer-implemented method of claim 4, wherein the idle timeout is determined based on (i) an amount of time associated with performing the second set of action groups, (ii) the process integrity metric, and (iii) the global time interval.

7. A computing system comprising:
   one or more processors; and
   a memory comprising instructions, which when executed by the one or more processors, performs an operation for determining an idle timeout for a cloud computing session, the operation comprising:
   determining a first one or more attributes associated with a user of the cloud computing session;
   determining a second one or more attributes associated with an operation of the cloud computing session;
   determining an idle timeout for the cloud computing session, based at least in part on the first one or more attributes and the second one or more attributes, wherein the idle timeout is set to a first value;
   monitoring activity of the user during the cloud computing session; and
      upon determining, based on the monitoring, that there is activity of the user within a duration of the idle timeout set to the first value:
         determining a first set of action groups, based on the activity;
         predicting a second set of action groups, based on an evaluation of the first set of action groups;
         determining a second value for the idle timeout, based on the first set of action groups and the second set of action groups, wherein determining the second value for the idle timeout comprises (i) generating a set of time series models, each time series model being associated with a different action group of the second set of action groups and being configured to predict a time interval between the associated action group and another action group of the second set of action groups and (ii) determining a global time interval based on the predicted time intervals; and
   adjusting the idle timeout by setting the idle timeout to the second value, wherein the second value is different from the first value.

8. The computing system of claim 7, wherein:
   the idle timeout is one of a plurality of idle timeouts; and
   at least one of the first value or the second value of the idle timeout is different than at least one other idle timeout of the plurality of idle timeouts.

9. The computing system of claim 7, wherein determining the idle timeout comprises determining a process integrity metric associated with the operation of the cloud computing session, based at least in part on evaluating at least one of the second one or more attributes with a cluster model.

10. The computing system of claim 9, wherein:
the second one or more attributes comprises a vector having a parameter part and a type part; and
determining the process integrity metric further comprises:
determining, in the cluster model, a position associated with the process integrity metric, based on the parameter part of the vector; and
determining a number of distances from the position, based on the type part of the vector.

11. The computing system of claim 9, wherein each action group in the second set of action groups comprises one or more actions performed as part of the operation of the cloud computing session.

12. The computing system of claim 10, wherein the idle timeout is determined based on (i) an amount of time associated with performing the second set of action groups, (ii) the process integrity metric, and (iii) the global time interval.

13. A non-transitory computer-readable storage medium having computer-readable program code embodied therewith, the computer-readable program code executable by one or more computer processors to perform an operation for determining an idle timeout for a cloud computing session, the operation comprising:
determining a first one or more attributes associated with a user of the cloud computing session;
determining a second one or more attributes associated with an operation of the cloud computing session;
determining an idle timeout for the cloud computing session, based at least in part on the first one or more attributes and the second one or more attributes, wherein the idle timeout is set to a first value;
monitoring activity of the user during the cloud computing session; and
upon determining, based on the monitoring, that there is activity of the user within a duration of the idle timeout set to the first value:
determining a first set of action groups, based on the activity;
predicting a second set of action groups, based on an evaluation of the first set of action groups;
determining a second value for the idle timeout, based on the first set of action groups and the second set of action groups, wherein determining the second value for the idle timeout comprises (i) generating a set of time series models, each time series model being associated with a different action group of the second set of action groups and being configured to predict a time interval between the associated action group and another action group of the second set of action groups and (ii) determining a global time interval based on the predicted time intervals; and
adjusting the idle timeout by setting the idle timeout to the second value, wherein the second value is different from the first value.

14. The non-transitory computer-readable storage medium of claim 13, wherein:
the idle timeout is one of a plurality of idle timeouts; and
at least one of the first value or the second value of the idle timeout is different than at least one other idle timeout of the plurality of idle timeouts.

15. The non-transitory computer-readable storage medium of claim 13, wherein determining the idle timeout comprises determining a process integrity metric associated with the operation of the cloud computing session, based at least in part on evaluating at least one of the second one or more attributes with a cluster model.

16. The non-transitory computer-readable storage medium of claim 15, wherein:
the second one or more attributes comprises a vector having a parameter part and a type part; and
determining the process integrity metric further comprises:
determining, in the cluster model, a position associated with the process integrity metric, based on the parameter part of the vector; and
determining a number of distances from the position, based on the type part of the vector.

17. The non-transitory computer-readable storage medium of claim 16, wherein the idle timeout is determined based on (i) an amount of time associated with performing the second set of action groups, (ii) the process integrity metric, and (iii) the global time interval.

18. The non-transitory computer-readable storage medium of claim 15, wherein each action group in the second set of action groups comprises one or more actions performed as part of the operation of the cloud computing session.

* * * * *